United States Patent
Benchaib et al.

(10) Patent No.: US 9,559,595 B2
(45) Date of Patent: Jan. 31, 2017

(54) BIDIRECTIONAL MULTI-LEVEL DC/DC CONVERTER WITH AN INDEPENDENT CONTROL MODULE FOR EACH CONVERSION STAGE

(71) Applicant: ALSTOM TECHNOLOGY LTD, Baden (CN)

(72) Inventors: Abdelkrim Benchaib, Montigny-le-Bretonneux (FR); Miguel Jimenez Carrizosa, Paris (FR)

(73) Assignee: ALSTOM TECHNOLOGY LTD, Baden (CH)

( * ) Notice: Subject to any disclaimer, the term of this patent is extended or adjusted under 35 U.S.C. 154(b) by 98 days.

(21) Appl. No.: 14/398,446

(22) PCT Filed: Apr. 25, 2013

(86) PCT No.: PCT/EP2013/058622
§ 371 (c)(1),
(2) Date: Oct. 31, 2014

(87) PCT Pub. No.: WO2013/164249
PCT Pub. Date: Nov. 7, 2013

(65) Prior Publication Data
US 2015/0085531 A1  Mar. 26, 2015

(30) Foreign Application Priority Data

May 4, 2012 (FR) ...................... 12 54124

(51) Int. Cl.
*H02M 3/335* (2006.01)
*H02M 3/337* (2006.01)
*H02M 1/00* (2006.01)

(52) U.S. Cl.
CPC ......... *H02M 3/33507* (2013.01); *H02M 3/337* (2013.01); *H02M 2001/007* (2013.01)

(58) Field of Classification Search
CPC ................. H02J 2001/002; H02J 2001/008; H02J 1/06; H02J 1/10; H02J 1/102; H02M 2001/0067; H02M 2001/007; H02M 2001/0074; H02M 2001/0077; H02M 3/33584; H02M 3/33523

See application file for complete search history.

(56) References Cited

U.S. PATENT DOCUMENTS 593,138 A * 11/1897 Tesla ..................... G05B 11/016
307/149
2011/0056533 A1   3/2011 Kuan

FOREIGN PATENT DOCUMENTS

| EP | 2104216 A1 | 9/2009 |
| EP | 2234237 A1 | 9/2010 |
| EP | 2293407 A1 | 3/2011 |

OTHER PUBLICATIONS

Hirofumi Akagi, et al; Control and Design of a Modular Multilevel Cascade BTB System Using Bidirectional Isolated DC/DC Converters; IEEE Transactions on Power Electronics, vol. 26, No. 9, Sep. 1, 2011, pp. 2457-2464.

(Continued)

*Primary Examiner* — Harry Behm
*Assistant Examiner* — Peter Novak
(74) *Attorney, Agent, or Firm* — Nixon Peabody, LLP; Khaled Shami

(57) ABSTRACT

The invention relates to a bidirectional multi-level DC/DC converter and its non-linear control, adapted to transfer power between at least one energy source and an electricity distribution network.

4 Claims, 3 Drawing Sheets

(56) References Cited

OTHER PUBLICATIONS

International Search Report for PCT Application No. PCT/EP2013/058622 dated Jul. 15, 2013.
Jie Chen, et al; Design of DC Architecture for Large-Scale Non-Grid-Connected Wind Power Generation System; Power and Energy Engineering Conference, 2009. APPEEC 2009. Asia-Pacific, IEEE, Piscataway, NJ, USA; Mar. 27, 2009; pp. 1-5.

* cited by examiner

BIDIRECTIONAL MULTI-LEVEL DC/DC CONVERTER WITH AN INDEPENDENT CONTROL MODULE FOR EACH CONVERSION STAGE

CROSS-REFERENCE TO RELATED PATENT APPLICATIONS

The present application is a 35 U.S.C. §371 National Stage Application of International Application No. PCT/EP2013/058622 entitled "NONLINEAR CONTROL DEVICE FOR A DC/DC CONVERTER USED FOR CONVEYING HVDC CURRENT" filed Apr. 25, 2013, which claims benefit of priority to French Application No. 1254124 filed on May 4, 2012. Both of these applications are incorporated herein by reference in their entirety.

TECHNICAL FIELD

The invention lies in the field of transporting electrical power of very high-voltage direct current (HVDC). It relates more particularly to the non-linear control of DC/DC converter devices.

STATE OF THE PRIOR ART

Large-scale production of renewable energy is currently under study in numerous electricity network projects in which the energy sources are at distances of a few tens, or even hundreds of kilometers from consumers.

There are proposals to use wind or tidal energy in order to create offshore farms, so as to benefit from favorable air or sea currents and larger usable areas. Use is currently made of photoelectric energy through solar power parks situated in vast desert zones.

Those parks or farms are constituted by a multitude of energy sources (wind turbines, tidal generators, solar panels) and by associated power electronics. The power electronics of such a park are traditionally connected to a remote electricity distribution network via three-phase lines using alternating current (AC).

However, recent developments aim to replace the AC lines with HVDC lines.

The term "high-voltage" refers to voltages greater than 10 kilovolts (kV).

The advantages obtained by using high-voltage direct current lines are numerous. These advantages include:
  only two conductors are necessary instead of three for AC;
  capacitive current in DC power transport lines is very low;
  the use of a high voltage makes it possible to reduce the current transported by the cables, and consequently to reduce the losses in lines due to the Joule effect; and
  the use of HVDC eliminates the problems of synchronization that are encountered when using a plurality of AC sources.

In addition, it is known that for offshore parks, only HVDC lines can be used for undersea connections that are longer than 60 kilometers (km).

FIG. 1a is a block diagram of an electricity network using HVDC transport lines, when the energy source is a wind farm.

The network 1 is made up of an energy source 10 of the wind farm type, that delivers a three-phase AC at low voltage at a power level that depends on the strength of the wind.

The electricity network 1 comprises an AC/DC converter or rectifier 20, and a low voltage DC/high voltage DC converter 30. The converters 20 and 30 are installed in a submerged platform in the proximity of the wind farm.

The AC/DC converter 20 converts the three-phase AC voltage supplied by the energy source 10, into a single-phase DC voltage. The DC/DC converter 30, converts the low-voltage DC at the outlet from the rectifier 20 into high-voltage DC, so as to inject it into HVDC cables 40, e.g. cables that are a few hundreds of kilometers long. These cables are connected to a DC/AC converter 50 (or inverter) that is shore-based, and that makes it possible to supply power to the electricity distribution network 60 in the form of three-phase AC.

FIG. 1b is a block diagram of an electricity network using HVDC transport lines, when the energy source is a solar power park. Elements of the networks described in FIGS. 1b and 1a and carrying identical references have the same functions and are therefore not described again in order to remain concise.

In FIG. 1b, the network 1 is made up of an energy source 10' of the solar power park type, which source delivers low-voltage DC, at a power level that depends on the amount of sunlight. The electricity network 1 includes a DC/DC converter 20' (and its control) that implements maximum power point tracking (MPPT) techniques in real time for the solar power park. The DC/DC converter 30, converts the low-voltage DC at the outlet of the DC/DC converter 20' into high-voltage DC.

In the diagrams shown in FIGS. 1a and 1b, the converter 30 is bidirectional. That property is fundamental because it enables dynamic energy storage to be implemented so as to deliver constant power to the electricity distribution network 60, regardless of the variations in the power supplied by the energy source and regardless also of variations in energy demand.

Thus, storage batteries 70a, 70b are placed respectively on the low voltage side and on the high voltage side of the DC/DC converter 30 so as to implement dynamic energy storage. The bidirectional character of the converter 30 is further used for recharging said storage batteries.

When the source is of the solar power park type, the storage battery 70a is also used for implementing maximum power point tracking techniques in real time.

It should be observed that some research is currently being undertaken with the aim of designing a bidirectional DC/DC converter 30 that can receive power from a plurality of energy sources so as to transfer a total amount of power to an electricity distribution network 60 via HVDC cables 40. That research seeks to make use of the complementarities of renewable energy sources.

FIG. 1c is a block diagram of an electricity network using HVDC transport lines, when the energy sources comprise both a solar power park and a wind farm, situated for example a few kilometers apart from each other. Elements of the networks described in FIGS. 1c, 1b, and 1a and carrying identical references have the same functions and are therefore not described again in order to remain concise. In the network 1, the DC/DC converter receives low-voltage DC from a plurality of energy sources and transfers a high voltage to an electricity distribution network 60.

Various topologies for bidirectional DC/DC converters may be envisaged in order to perform the function of the low-voltage DC/high voltage DC converter 30. The dual active bridge (DAB) topology has recently been the subject of in-depth studies since it enables soft switching techniques to be implemented (also referred to as spontaneous switching) and since it is insensitive to stray inductance. In addition, that topology uses a transformer that advantageously provides isolation between the low voltage and the high voltage.

Finally, the DAB topology is advantageous in that it makes it possible to implement modulation techniques based on the use of arbitrary duty ratios so as to reduce the reactive power of the transformer as well as switching losses. Switches may be operated with zero voltage switching (ZVS) or zero current switching (ZCS) in order to reduce switching losses.

An example of a DC/DC converter 30' in DAB topology is shown in FIG. 2. It comprises two bidirectional DC/AC converters 20a, 20b, mounted symmetrically and isolated by a transformer 21 comprising a primary 21a, a secondary 21b, and leakage inductance 21c.

By way of example, the transformer 21 is based on the single magnetic core with coils in the two branches of the core.

A bidirectional DC/AC converter 20a is connected to the terminals of the primary 21a, while the other bidirectional DC/AC converter 20b is connected to the terminals of the secondary 21b.

The transformation ratio m of the transformer is greater than or equal to 1, so that the bidirectional DC/AC converter 20b connected to the terminals of the secondary is referred to as a "high-voltage converter". In contrast, the other bidirectional DC/AC converter is referred to as a "low-voltage converter" 20a.

If the DAB topology DC/DC converter is to be integrated in the diagram of FIG. 1a or 1b, the low-voltage converter 20a is connected to the outlet of the rectifier 20 or of the DC/DC converter 20' and has the voltage $V_{in}$ at its terminals, whereas the high-voltage converter 20b is connected to the HVDC lines 40 and has the voltage $V_{out}$ at its terminals.

Each of the high-voltage 20b and low-voltage 20a converters contains a plurality of switches in a single-phase bridge configuration.

Thus, the low-voltage converter 20a comprises four switches J1, J2, J3, and J4 and a capacitor C1. The switches J1 and J3 are situated in a first arm while the switches J2 and J4 are situated in a second arm. The resonance capacitor C1 is connected in parallel with the first arm, at the inlet of the bridge. The primary 21a is connected to the low-voltage converter 20a via a first node between the switches J1 and J3 and via a second node between the switches J2 and J4.

The high-voltage converter 20b comprises four switches J5, J6, J7, and J8 and a capacitor C2. The switches J5 and J7 are situated in a second arm while the switches J6 and J8 are situated in a first arm. The resonance capacitor C2 is connected in parallel with the first arm. The secondary 21b is connected to the high-voltage converter 20b via a first node between the switches J6 and J8 and via a second node between the switches J5 and J7.

The switches J1, J2, J3, J4, J5, J6, J7, and J8 are conventionally bidirectional field effect transistors (FETs). The bidirectionality of the switches and the use of a transformer 21 give the DAB topology DC/DC converter its bidirectional character.

The leakage inductance 21c, of magnitude L, of the transformer acts as an energy transfer component between the low-voltage DC/AC converter 20a and the high-voltage DC/AC converter during a switching period T. A coil may also be connected in series, or in parallel, between the primary and the low-voltage converter 20a for this purpose.

The switches of the DAB topology DC/DC converter are controlled by means of a control circuit.

When the DAB topology DC/DC converter is used to transfer power from the low-voltage converter 20a to the high-voltage converter 20b, the switches J1, J2, J3, J4 of the low-voltage converter are controlled in order to convert, during the switching period T, a DC voltage $V_{in}$ at the terminals of the low-voltage converter 20a into an AC voltage $V'_{in}$ at the primary 21a. The current $i_1$ in the low-voltage DC/AC converter is thus positive. The switches of the high-voltage converter 20b are controlled, during the same switching period T, in order to convert an AC voltage $V'_{out}$ at the terminals of the secondary 21b into a DC $V_{out}$ voltage at the terminals of the high-voltage converter 20b.

It should be understood that operation is symmetrical when the DAB topology DC/DC converter is used to convey power from the high-voltage converter 20b towards the low-voltage converter 20a. In this event, the current $i_1$ in the low-voltage DC/AC converter is negative.

The above-described DAB topology DC/DC converter does not enable power to be transferred from a plurality of renewable energy sources to an electricity distribution network via HVDC lines.

In addition, integrating a DAB topology DC/DC converter in a HVDC electric network is limited by its low efficiency both at low power and at high power.

As an illustration, when the DAB topology DC/DC converter is used to transfer power of the order of 1 megawatt (MW), the low-voltage converter 20a has a voltage of the order of 1000 volts (V) and a current of 1000 amps (A) at its terminals, and the high-voltage converter 20b has a voltage of the order of 10,000 V and a current of 100 A at its terminals.

Thus, for a power transfer of at least 1 MW, the switches of the DC/AC converter must withstand very high voltages. That requires transistors to be selected that have very high blocking voltages so as to reduce conduction losses of the switches in the DC/DC converter.

However, the blocking voltages currently reached by certain models of transistor using silicon carbide (SiC) metal-oxide semiconductor field effect transistor (MOSFET) technology or SiC junction field-effect transistor (JFET) technology are of the order of 1.2 kV.

However, the development of SiC technology has seen a clear increase in the blocking voltages of SiC MOSFETs of up to 10 kV and in SiC JFETs of up to 6.5 kV. These values nevertheless remain unsatisfactory and do not enable DAB topology to be used for DC/DC conversion with voltages at the outlet of the high-voltage DC/AC converter of the order of tens of kilovolts, without risk of damaging the transistors.

Consequently, for power transfers of more than one megawatt (1 MW), the conversion efficiency of a DAB topology DC/DC converter is low.

In addition, the transistors are dimensioned for the maximum power that the source might theoretically provide. However, the source provides power that depends on external conditions (wind, sea currents, amount of sunshine), and most of the time that power is lower than the theoretical maximum value. The transistors thus have considerable switching losses that reduce the efficiency of the DAB topology DC/DC converter.

One solution envisaged in the prior art for using DAB topology for high power DC/DC converters is to make multi-level DC/DC converters in which n similar DAB converters, where n≥2, are placed in parallel-series.

The term "similar" means here that the electronic components of each of the levels are the same.

More precisely, FIG. 3 shows a diagram of a 2-level DC/DC converter 30", in which each level corresponds to a DAB topology bidirectional DC/DC converter 30' as described with reference to FIG. 2.

In that diagram the multi-level converter receives a voltage $V_{in}$ and a current $i_{in\text{-}total}$. At the outlet, it produces a voltage $V_{out\text{-}total}$ and a current $i_{OUT}$.

The inlets of the DC/AC low voltage converters of the two levels are connected in series so that each level receives the same voltage $V_{in}$ and a current $i_{in}$ equal to $$\frac{i_{in\text{-}total}}{n}.$$

Each level acts as a voltage raiser since it multiplies the input voltage $V_{in}$ received at its low-voltage DC/AC converter with a conversion ratio m, with m>1. At the outlet of the high-voltage DC/AC converter of each level, the voltage is therefore $V_{out}=m \cdot V_{in}$.

The outlets of the high-voltage DC/AC converters of each level are connected in parallel so that at the outlet of the multi-level converter, the voltage $V_{out\text{-}total}=m \cdot n \cdot V_{in}$ is obtained at a current $$I_{OUT} = \frac{i_{in\text{-}total}}{m \cdot n}.$$

The advantage of such a configuration is that the voltage $V_{out\text{-}total}$ at the outlet of the converter is equal to the sum of the voltages $V_{out}$ at the outlets of each of the n levels. By appropriately selecting the value n and the conversion ratio m it is possible to obtain a high voltage $V_{out\text{-}total}$, while limiting the maximum voltage, or the maximum current, that needs to be withstood by the switches respectively of the high-voltage DC/AC converter and of the low-voltage DC/AC converter of each level. It is therefore possible to use transistors that are readily available commercially.

More precisely, the values of n and m are selected so as to limit the switching and conduction losses in each level and to reduce the risk of the transistors breaking down. This last point is particularly advantageous for application to the submerged power electronics of an offshore wind farm that it will be understood is difficult to access in the event of a repair needing to be carried out.

In contrast, no control system currently exists that makes it possible to ensure robust control of such a bidirectional DAB topology multi-level DC/DC converter in the context of transmitting high powers with DC current, using non-linear voltage sources such as renewable energy sources.

The control of a DAB converter must ensure that the DC/DC conversion is very stable, which is a condition necessary to ensure the overall stability of the electricity network as described with reference to FIGS. 1a, 1b, and 1c.

The sources of instability, e.g. as described in the article entitled "Stability Analysis of High-Power DC Grids", by Mura et al., IEEE, are unbalances, distortions and other disturbances coming from the electronic components of the converters. Thus, and with reference to FIGS. 1a, 1b, and 1c, the AC/DC converters 20 or the DC/AC converters 50, which are controlled by modulation techniques of the pulse width modulation (PWM) type, may inject conduction harmonics into the network in addition to DC components. Oscillations leading to resonance and problems of stability in the DC/DC conversion may then appear.

An object of the invention is to provide a bidirectional multi-level DC/DC converter and its non-linear control, that are adapted to transfer power between at least one energy source and an electricity distribution network.

SUMMARY OF THE INVENTION

That object is reached by a multi-level DC/DC converter comprising n conversion stages, n being greater than or equal to 2, said converter being characterized in that it is adapted to transfer power in bidirectional manner between firstly at least one individual DC voltage source, and secondly a DC voltage network source, the voltage of said network source being greater that that of each of said individual sources, each of the conversion stages comprising:

a converter module adapted to transfer power in bidirectional manner between firstly one of the individual DC voltage sources, and secondly, said DC voltage network source, said converter module comprising a transformer having a primary and a secondary and leakage inductance, the transformation ratio of said transformer being greater than 1, said module further comprising a first converter and a second converter, each of said converters containing a plurality of gate-controlled bidirectional switches in a single-phase bridge configuration for converting a DC voltage into an AC voltage, said first converter being connected to the terminals of said primary, said second converter being connected to the terminals of said secondary, said primary having at its terminals a first AC voltage, and said secondary having at its terminals a second AC voltage, said first converter having at its terminals a first DC voltage given by the individual source to the terminals of which it is connected and the second converter having at its terminals a second DC voltage given by said network source; and a control module that is identical in each of said levels, said control module being connected to the gates of the switches of said converter module in order to control their switching states during a switching period T, said control module comparing the value of the current in said first converter with a reference current and adjusting the phase offset between the AC voltages at the primary and at the secondary of said transformer as obtained by switching said switches as a function of the result of the comparison in such a manner as to adjust the power conveyed by the converter module;

the second converters of said levels being arranged in parallel, the sum of the n voltages at the outlets of said second converters being equal to the voltage of the network source.

Preferably, at least two converter modules are connected to the same individual voltage source.

According to the invention, a reference current value is transmitted to each of the n control modules by a CPU module.

Advantageously, the converter of the invention includes at least one reserve level, the value of the reference current of the control module of said reserve module being zero.

BRIEF DESCRIPTION OF THE DRAWINGS

Other characteristics and advantages of the invention appear on reading a description of the preferred embodiment of the invention made with reference to the accompanying figures, in which.

DETAILED DESCRIPTION OF PARTICULAR EMBODIMENTS

The idea forming the basis of the invention is to design a system of bidirectional DC/DC multi-level conversion for HVDC applications using DC/DC converter modules and independent control modules. The conversion system of the invention is designed to be integrated into an electricity network, so as to convert (in bidirectional manner) one or more low-voltage DCs into a high-voltage DC suitable for conveying to an electricity distribution network via HVDC lines.

The modularity of the multi-level converter of the invention provides a plug-and-play type approach since each level of the DC/DC multi-level converter is independent from the others and the interventions/parameter settings that need to be carried out in order to install or uninstall a level are thus minimal.

In addition, the independence of level control makes it possible to deactivate/activate a level without disturbing the stability of the multi-level DC/DC converter of the invention.

More precisely, the DC/DC multi-level converter of the invention is described with reference to FIGS. 1a, 1b, 1c, and 2.

The multi-level DC/DC converter is adapted to convey power in bidirectional manner between firstly at least one individual DC voltage source, and secondly a single DC voltage network source.

The voltage at the terminals of the network source is greater than the voltage(s) at the terminals of the individual voltage source(s).

Figure 1A:
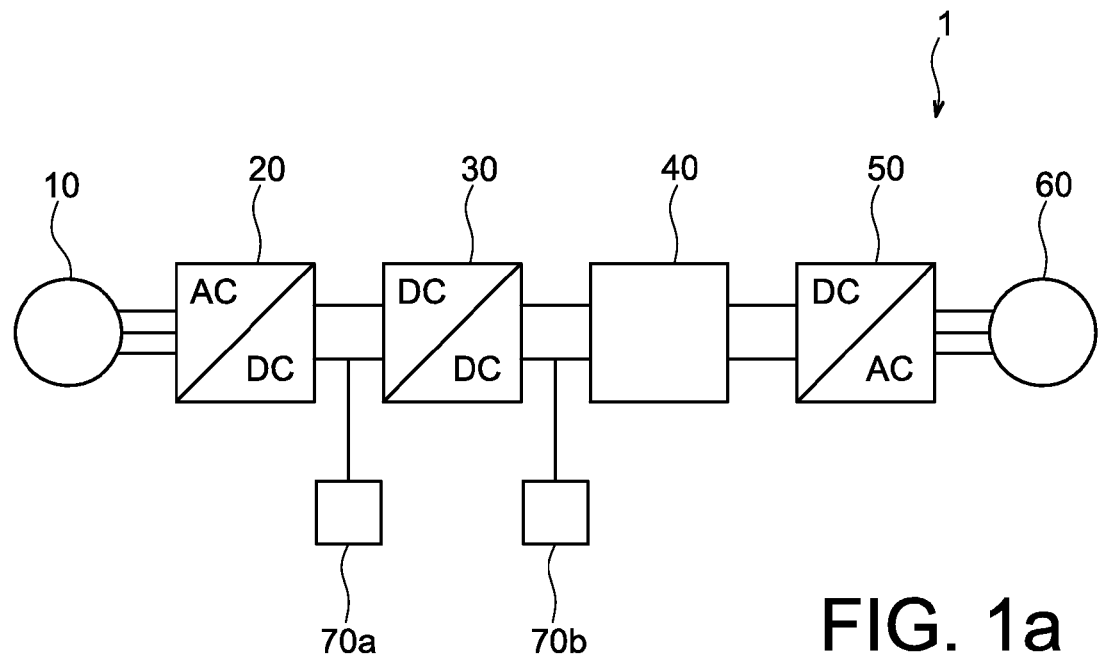
FIG. 1a, described above, is a block diagram of an electricity network using HVDC transport lines, when the energy source is a wind farm.
Figure 1B:
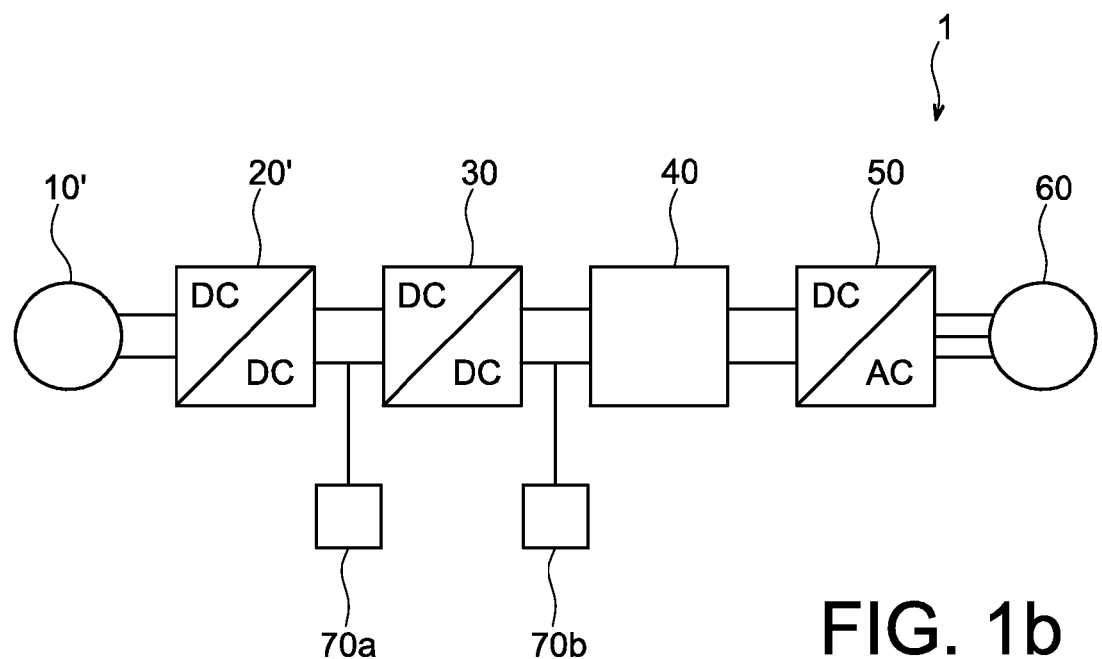
FIG. 1b, described above, is a block diagram of an electricity network using HVDC transport lines, when the energy source is a solar power park.
Figure 1C:
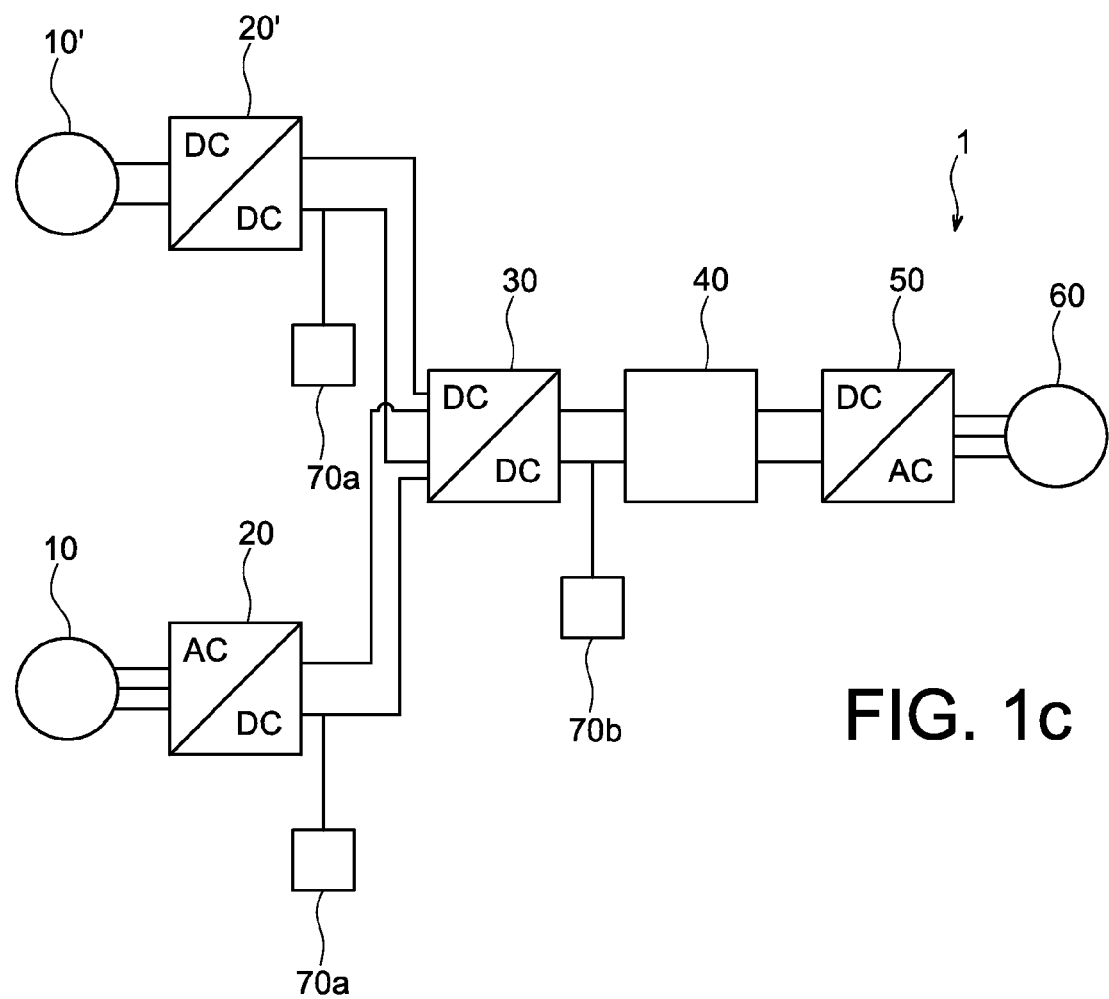
FIG. 1c, described above, is a block diagram of an electricity network using HVDC transport lines, when the energy sources are a wind farm and a solar power park.

With reference to FIGS. 1a, 1b, and 1c, the network source may comprise the storage element 70b and the electricity distribution network 60 connected to the multi-level DC/DC converter via the HVDC cables 40 and the converter 50.

Consequently, the DC network source can receive a DC voltage from the multi-level DC/DC converter, but can also supply a DC voltage to the multi-level DC/DC converter.

In reference to FIGS. 1a, 1b, and 1c, the individual DC voltage source may comprise the storage element 70a and an energy source 10, 10' as well as its power electronics that supply a low-voltage DC. An individual DC source can thus receive a DC voltage from the multi-level DC/DC converter, but can also supply a DC voltage to the multi-level DC/DC converter.

By way of example, the energy source is a renewable energy source such as a wind farm, a tidal power station, or even a solar power park.

An individual source of DC voltage may also be an element for storing electrical power.

The multi-level DC/DC converter comprises n levels with $n \geq 2$.

Each of the levels is configured in the same manner and comprises a converter module and a control module.

Figure 2:
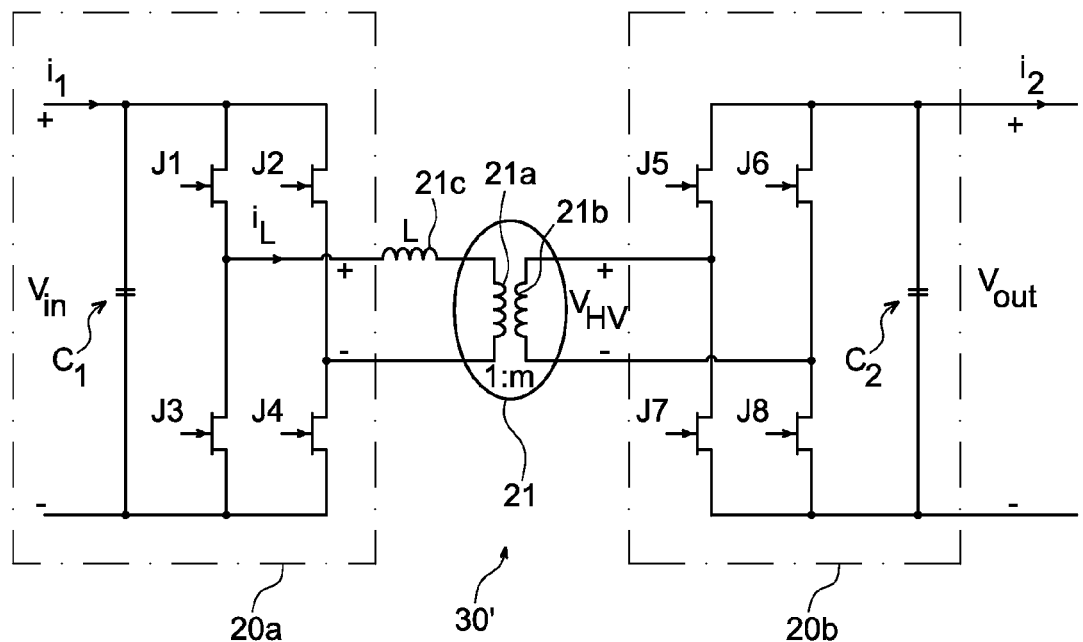
FIG. 2, described above, is the circuit diagram of a DC/DC converter in DAB topology.
Figure 3:
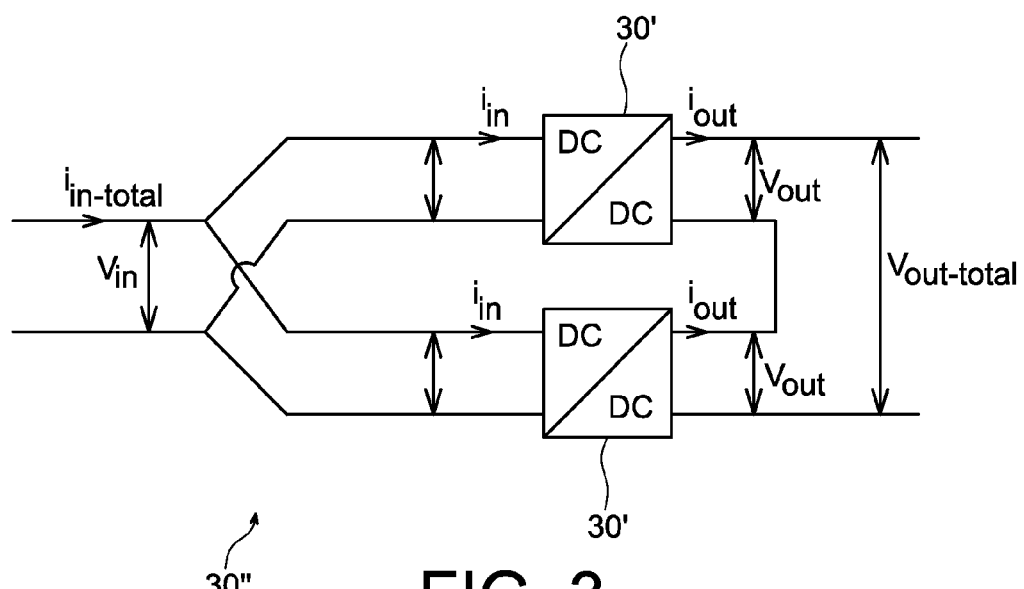
FIG. 3, described above, is a circuit diagram of a multi-level DC/DC converter in DAB topology.

A converter module comprises a DAB topology DC/DC converter as described with reference to FIG. 2. A converter module is adapted to convey power in bidirectional manner between firstly one of the individual DC voltage sources to which it is connected, and secondly the DC voltage network source.

The low-voltage DC/AC converter 20a of the converter module of the $k^{th}$ level, with $1 < k \leq n$, is connected to the terminals of the primary 21a of the transformer 21 and has at its terminals a first DC voltage $V_{in-k}$ given by the individual source to the terminals of which it is connected.

The high-voltage DC/AC converter 20b of the converter module of the $k^{th}$ level, with $1 < k \leq n$, is connected to the terminals of the secondary 21b and has at its terminals a second DC voltage $V_{out}$.

The transformation ratio $\underline{m}^m$ of the converter module of the $k^{th}$ level is greater than or equal to 1.

Preferably, $\underline{m}$ is chosen so that $$m > \frac{V_{out}}{V_{in-max}},$$

with $V_{in-max}$ being the maximum DC voltage that the individual source is able to supply, to which individual source is connected the converter module of the $k^{th}$ level. This choice of value for $\underline{m}$ makes it possible to implement switching techniques at zero voltage in switches J5, J6, J7, and J8 of the high-voltage DC/AC converter 20b.

In the invention, all of the high-voltage DC/AC converters 20b of the $\underline{n}$ converter modules are connected in parallel so that the sum $V_{out}$ of the $\underline{n}$ output voltages of the high-voltage DC/AC converters 20b is equal to the voltage $V_{out-total}$ given by the network source.

Consequently, when power is transferred from the individual voltage sources to the network source, the multi-level DC/DC converter of the invention makes it possible to obtain a high voltage $V_{out-total}$ from one or more individual voltage source(s).

In addition, when power is transferred in the opposite direction, the multi-level DC/DC converter of the invention makes it possible to supply a DC voltage to each of the individual voltage sources from a single source delivering a voltage $V_{out-total}$. Dynamic energy storage may thus be implemented via the storage elements of the network.

Preferably, each converter module is dimensioned as a function of the individual voltage source to which it is connected. Consequently, the choice of components and of the transformer may vary from one converter module to another.

In an embodiment of the invention, at least two of the $\underline{n}$ levels of the multi-level DC/DC converter have the same individual voltage source so as to reduce the dimensioning constraints imposed on their respective switches J1, J2, J3, J4, J5, J6, J7, and J8. The efficiency of the conversion carried out in these modules is thus improved by reducing losses during switching as well as reducing transistor conduction losses.

Low-voltage DC/AC converters of levels that have the same individual voltage source are thus connected in series.

Preferably, the components of converter modules having the same individual source of voltage are similar.

In the invention, each level includes a control module dedicated to the converter module of that level. "Dedicated" means that the control module is connected to one converter module only. More precisely, a control module is connected to the gates of switches J1, J2, J3, J4, J5, J6, J7, and J8 of a converter module in order to control the switching states of the switches.

A control module ensures robust non-linear control of a converter module for optimum use of the multi-level converter in a HVDC network, while at the same time enabling conversion to be bidirectional.

The control module is similar in each level, both in its structure and for the control algorithm that is implemented therein.

Consequently, implementation of the converter module is easy because the control algorithm is performed for a single level only, since control of the other levels is identical due to the fact that the multi-level DC/DC converter is designed to have identical modules in levels that are independent from a control point of view.

The switches of the conversion module are voltage controlled, and by way of example they are transistors of the MOSFET, JFET, or even IGBT type.

The control algorithm is developed so that one control module sends a setpoint to a converter module so that the current value $i_1$ in the low-voltage DC/AC converter 20a of the converter module is equal to a reference current value, written $i_{m1\text{-}ref}$.

The setpoint that is sent is the phase offset $\underline{d}$ between the AC voltage at the primary 21a, written $V'_{in}$, and the AC voltage at the secondary 21b, written $V'_{out}$, of the transformer of the converter module. The phase offset between these two AC voltages over a switching period T is obtained by switching switches of the converter module as a function of the result of the comparison between $i_1$ and $i_{m1\text{-}ref}$ in such a manner as to adjust the power conveyed by the converter module.

The sign of the reference current $i_{m1\text{-}ref}$ makes it possible to direct the flow of power, while its value adjusts the level of power conveyed.

More precisely, and for a level of the multi-level DC/DC converter, if $i_{m1\text{-}ref}>0$ then the power transfer takes place from an individual source towards the network source. If $i_{m1\text{-}ref}<0$, then the power transfer takes place from the network source towards the individual source. When $i_{m1\text{-}ref}$ is zero, the level is then deactivated.

The instabilities in the value of the current $i_1$ may in particular come from unbalances or fluctuations of the voltage given by the individual voltage source and/or by the network source, or even from switching losses.

A reference current value $i_{m1\text{-}ref}$ belonging to each level is transmitted to each control module by a central processing unit (CPU) module.

Preferably, the control modules for controlling the converter modules that have the same individual voltage source receive the same reference current value.

The design of the control algorithm is described below in relation to an example modulation scheme for the switches of a converter module in a preferred embodiment of the invention.

The modulation diagram implemented is such that the mean current at the terminals of the leakage inductance is zero during a switching period T, in such a manner as to eliminate short-circuits and overloading phenomena of the transformer and of the inductance.

The modulation scheme described below is given purely as an example and the design principles of the algorithm implemented in the invention are valid for other modulation schemes.

The overall dynamic behavior of a converter module is analyzed by means of the state space average modeling technique. In order to implement said technique, modeling of a converter module takes into account the conduction resistances of each of the switches so as to consider the losses in conduction of the transistors J1, J2, J3, J4, J5, J6, J7, and J8.

In addition, a single type of transistor is used for the switches J1, J2, J3, and J4 of the low-voltage DC/AC converter 20a and a single type of transistor is used for the switches J5, J6, J7, and J8 of the high-voltage DC/AC converter 20b.

Thus, a conduction resistance $RDS_{on}1$ is connected in series with each switch J1, J2, J3, and J4 and a conduction resistance $RDS_{on}2$ is connected in series with each switch J5, J6, J7, and J8.

When the power transfer is directed from the low-voltage converter 20a to the high-voltage converter 20b of a converter module, the primary 21a receives an AC voltage $V'_{in}$ and the transformer 21 transforms the voltage $V'_{in}$ into voltage $V'_{out}$ at its secondary 21b, with $V'_{in}<V'_{out}$.

In this event, d>0 and the state of the switches is thus given in Table 1 below, in which the term "on" refers to the state in which the switch is passing current, and the term "off" refers to the blocked state of the switch.

TABLE 1

| Intervals | J1 | J2 | J3 | J4 | J5 | J6 | J7 | J8 |
|---|---|---|---|---|---|---|---|---|
| [0, d · T] | on | off | off | on | off | on | on | off |
| [d · T, T/2] | on | off | off | on | on | off | off | on |
| [T/2, (½ + d) · T] | off | on | on | off | on | off | off | on |
| [(½ + d) · T, T] | off | on | on | off | off | on | on | off |

When the power transfer is directed from the high-voltage converter 20b to the low-voltage converter 20a of a converter module, the secondary 21b receives an AC voltage $V'_{out}$ and the transformer 21 transforms the voltage $V'_{out}$ into voltage $V'_{in}$ at its primary 21a, with $V'_{in}<V'_{out}$.

In this event, d<0 and the state of the switches is thus given in Table 2 below:

TABLE 2

| Intervals | J1 | J2 | J3 | J4 | J5 | J6 | J7 | J8 |
|---|---|---|---|---|---|---|---|---|
| [0, ḋ · T] | on | off | off | on | on | off | off | on |
| [ḋ · T, T/2] | on | off | off | on | off | on | on | off |
| [T/2, (½ + ḋ) · T] | off | on | on | off | off | on | on | off |
| [(½ + ḋ) · T, T] | off | on | on | off | on | off | off | on |

The state space average modeling of the converter module is implemented over a switching period T. It is shown below that over this time T, the mean current $i_{m1}$ in the low-voltage DC/AC converter is governed by a first order linear differential system having constant coefficients, such that:

$$\frac{di_{m1}(t)}{dt} = -\frac{Rtotal}{L} \cdot i_{m1}(t) + \frac{T \cdot Rtotal}{L^2} \cdot d \cdot (1 - 2|d|) \cdot \frac{V'_{out}}{n} \quad (1)$$

$$\text{with } Rtotal = \left(RDS_{on}1 + \frac{RDS_{on}2}{n^2}\right)$$

The control algorithm for controlling the converter module is implemented by means of Lyapunov's stability theory.

The strictly positive Lyapunov energy function that is selected is the following:

$$Q_{im1} = \tfrac{1}{2}(i_{m1} - i_{m1\text{-}ref})^2 = \tfrac{1}{2}(E_{im1})^2 \qquad (2)$$

with $E_{im1} = (i_{m1} - i_{m1\text{-}ref})$ being the regulation error.

According to Lyapunov's theory, the stability of the function $Q_{im1}$ is stable for:

$$\dot{Q}_{im1} = \qquad (3)$$

$$E_{im1} \cdot \left( -\frac{Rtotal}{L} i_{m1} + \frac{T \cdot Rtotal}{L^2} \cdot d \cdot (1 - 2|d|) \cdot \frac{V'_{out}}{n} - \dot{i}_{m1\text{-}ref} \right) \leq 0$$

Assuming that:

$$-\frac{Rtotal}{L} i_{m1} + \frac{T \cdot Rtotal}{L^2} \cdot d \cdot (1 - 2|d|) \cdot \frac{V'_{out}}{n} - \dot{i}_{m1\text{-}ref} = \qquad (4)$$

$$-\alpha_{im1} \cdot E_{im1} - \beta_{im1} \cdot \text{sign}(E_{im1})$$

with $\alpha_{im1} \geq 0$ and $\beta_{im1} \geq 0$

The sufficient condition for ensuring that the converter module is stable is to select $\alpha_{iL} > 0$ and $\beta_{iL} > 0$. The values $\alpha_{iL}$ and $\beta_{iL}$ depend in particular on electronic components of the converter module and they are estimated via computer simulations.

It is shown that the control algorithm implemented in each control module is given by:

$$d = \frac{1 - \sqrt{1 - 8K}}{4} \cdot S1 + \frac{-1 + \sqrt{1 + 8K}}{4} \cdot S2 \qquad (5)$$

with $$K = \frac{n \cdot L^2}{R_{total} \cdot T \cdot V_{out}} \cdot \left[ \alpha_{im1} \cdot E_{im1} - \beta_{im1} \cdot \text{sign}(E_{im1}) + \dot{i}_{m1\text{-}ref} + \frac{Rtotal}{L} i_{m1} \right]$$

$$\frac{n \cdot L^2}{R_{total} \cdot T \cdot V'_{out}} \cdot \left[ \alpha_{im1} \cdot E_{im1} - \beta_{im1} \cdot \text{sign}(E_{im1}) + \dot{i}_{m1\text{-}ref} + \frac{Rtotal}{L} i_{m1} \right]$$

S1=0 and S2=1 if $i_{m1\text{-}ref} < 0$
S1=1 and S2=0 if $i_{m1\text{-}ref} > 0$
S1=0 and S2=0 if $i_{m1\text{-}ref} = 0$ $t_{m1\text{-}ref} = 0$ This algorithm is implemented by a logic circuit of the control module.

The CPU module includes a communications module so as to communicate with an operator of the network. Preferably, the network operator provides the reference currents to be given to the control modules.

In a variant, the CPU module is an independent module that itself calculates the reference currents to apply to the control modules on the basis of a power to be transferred, as supplied by the network operator.

A level of the DC/DC multi-level converter can be activated instantaneously, when $i_{m1\text{-}ref} \neq 0$, or it can be deactivated when $i_{m1\text{-}ref} = 0$. In particular, this characteristic makes it possible to adapt the DC/DC multi-level converter as a function of the power level that it is desired to transferred.

Advantageously, the multi-level converter of the invention comprises at least one reserve or backup level. A reserve level is a level in which the switches of the converter module are made to switch only on the order of the network operator.

The reserve level may be activated in particular in order to replace a defective level, which is then deactivated.

The installation of reserve levels is particularly advantageous when the converter system of the invention is installed in a submerged platform, that is by definition difficult to access. The modularity of the converter of the invention, in particular the single and independent control for each level, thus avoids maintenance interventions, and the levels are very easy to activate or deactivate remotely.

Advantageously, the converter of the invention includes about 20% reserve modules.

The invention claimed is:

1. A multi-level DC/DC converter comprising n conversion stages, n being greater than or equal to 2, said converter being adapted to transfer power in bidirectional manner between at least one individual DC voltage source and a DC voltage network source, the voltage ($V_{out\text{-}total}$) of said network source being greater than that of each of said individual sources, each of the n conversion stages comprising:
a converter module adapted to transfer power in bidirectional manner between one of the individual DC voltage sources and said DC voltage network source, said converter module comprising a transformer having a primary winding and a secondary winding and leakage inductance, the transformation ratio (m) of said transformer being greater than 1, said converter module further comprising a first converter and a second converter, each of said converters containing a plurality of gate-controlled bidirectional switches in a single-phase bridge configuration for converting a DC voltage into an AC voltage, said first converter being connected to the terminals of said primary winding, said second converter being connected to the terminals of said secondary winding, said primary winding having at its terminals a first AC voltage [(V] ↓in' ($V'_{in}$) and the secondary winding having at its terminals a second AC voltage ($V'_{out}$), said first converter having at its terminals a first DC voltage given by the individual source to the terminals of which it is connected and the second converter having at its terminals a second DC voltage given by said network source;
the second converters of each of the n conversion stages being placed in parallel, the sum ($V_{out}$) of the n voltages being output by the said second converters being equal to the voltage ($V_{out\text{-}total}$) of the network source, characterized in that each of the n conversion stages comprises in addition:
an independent control module that is identical in each of the n conversion stages and that is connected to one converter module only, adapted to control the converter module of said conversion stage, said control module being connected to the gates of the switches of said converter module in order to control their switching states during a switching period T, said control module being configured to compare the value of the instantaneous current ($i_1$) in said first converter with a reference current ($i_{m1\text{-}ref}$) and to adjust the phase offset (d) between the AC voltages at the primary winding and at the secondary winding of said transformer as obtained by switching said switches, the adjustment being a function of the result of the comparison, in such a manner as to adjust the power conveyed by said converter module.

2. A multi-level converter according to the preceding claim 1, wherein at least two converter modules are connected to the same individual voltage source.

3. A multi-level converter according to claim 1, wherein a reference ($i_{m1\text{-}ref}$) current value is transmitted to each of the n control modules by a CPU module.

4. A multi-level converter according to claim 1, wherein said converter includes at least one reserve level, the value of the reference current ($i_{m1\text{-}ref}$) of the control module of said reserve level being zero.

* * * * *